United States Patent
Hoyle et al.

(10) Patent No.: US 6,834,338 B1
(45) Date of Patent: Dec. 21, 2004

(54) MICROPROCESSOR WITH BRANCH-DECREMENT INSTRUCTION THAT PROVIDES A TARGET AND CONDITIONALLY MODIFIES A TEST REGISTER IF THE REGISTER MEETS A CONDITION

(75) Inventors: David Hoyle, Glendale, AZ (US); Timothy D. Anderson, Dallas, TX (US)

(73) Assignee: Texas Instruments Incorporated, Dallas, TX (US)

( * ) Notice: Subject to any disclaimer, the term of this patent is extended or adjusted under 35 U.S.C. 154(b) by 574 days.

(21) Appl. No.: 09/703,144

(22) Filed: Oct. 31, 2000

Related U.S. Application Data
(60) Provisional application No. 60/138,527, filed on Feb. 18, 2000.

(51) Int. Cl.[7] ............................................. G06F 9/32
(52) U.S. Cl. ...................................... 712/234; 712/241
(58) Field of Search ............................... 712/233, 234, 712/239, 35, 300, 241

(56) References Cited

U.S. PATENT DOCUMENTS

| | | | | |
|---|---|---|---|---|
| 5,687,349 A | * | 11/1997 | McGarity | 711/137 |
| 5,761,723 A | * | 6/1998 | Black et al. | 711/144 |
| 5,848,288 A | * | 12/1998 | O'Connor | 712/24 |
| 5,901,318 A | * | 5/1999 | Hsu | 717/161 |
| 5,923,705 A | * | 7/1999 | Willkie et al. | 375/220 |
| 6,047,371 A | * | 4/2000 | Miyake et al. | 712/220 |

OTHER PUBLICATIONS

Intel, Pentium Processor Family Developer's Manual vol.3: Architecture and Programming Manual, 1995, pp. 1–7, 3–8, 3–10, 3–20, and 25–266 to 25–269.*

PowerPC Microprocessor Family: The Programming Environments, Rev.1, Jan. 1997, pp. 8–23 through 8–29.*

* cited by examiner

*Primary Examiner*—Eddie Chan
*Assistant Examiner*—Barry O'Brien
(74) *Attorney, Agent, or Firm*—Robert D. Marshall, Jr.; W. James Brady, III; Frederick J. Telecky, Jr.

(57) ABSTRACT

A data processing system is provided with a digital signal processor which has an instruction for conditionally branching based on the contents of a specified test register. Each time a branch is taken, the register is decremented as a side effect of executing the branch instruction. In addition, a predicate register is specified by the instruction. A branch occurs only if both registers meet specified conditions.

25 Claims, 7 Drawing Sheets

FIG. 3A

OPERATIONS ON THE .L UNIT

| 31 29 | 28 27 | 23 22 | 18 17 | 13 12 11 | 5 4 3 2 1 0 |
|---|---|---|---|---|---|
| CREG | Z | DST | SCR2 | SRC1/CST | X | OP | 1 1 0 S P |
| 3 | | 5 | 5 | 5 | 7 |

FIG. 3B

OPERATIONS ON THE .M UNIT

| 31 29 | 28 27 | 23 22 | 18 17 | 13 12 11 | 7 6 5 4 3 2 1 0 |
|---|---|---|---|---|---|
| CREG | Z | DST | SCR2 | SRC1/CST | X | OP | 0 0 0 0 S P |
| 3 | | 5 | 5 | 5 | 5 |

FIG. 3C

OPERATIONS ON THE .D UNIT

| 31 29 | 28 27 | 23 22 | 18 17 | 13 12 | 7 6 5 4 3 2 1 0 |
|---|---|---|---|---|---|
| CREG | Z | DST | SCR2 | SRC1/CST | OP | 1 0 0 0 S P |
| 3 | | 5 | 5 | 5 | 6 |

FIG. 3D

LOAD/STORE WITH 15-BIT OFFSET (ON THE .D UNIT)

| 31 29 | 28 27 | 23 22 | 8 7 6 | 4 3 2 1 0 |
|---|---|---|---|---|
| CREG | Z | DST/SRC | UCST15 | Y | LD/ST | 1 1 S P |
| 3 | | 5 | 15 | | 3 |

FIG. 3E

LOAD/STORE 'BASER' + 'OFFSETR/CST' ON THE .D UNIT

| 31 29 | 28 27 | 23 22 | 18 17 | 13 12 | 9 8 7 6 | 4 3 2 1 0 |
|---|---|---|---|---|---|---|
| CREG | Z | DST/SRC | BASE R | OFFSET R/UCST5 | MODE | R | Y | LD/ST | 0 1 S P |
| 3 | | 5 | 5 | 5 | 4 | | 3 |

FIG. 3F OPERATIONS ON THE .S UNIT

| 31 29 28 | 27 23 | 22 18 | 17 13 | 12 11 | 6 | 5 4 3 2 | 1 | 0 |
|---|---|---|---|---|---|---|---|---|
| CREG | Z | DST | SRC2 | SRC1/CST | X | OP | 0 0 0 0 | S | P |
| 3 | | 5 | 5 | 5 | | 6 | | | |

FIG. 3G ADDK ON THE .S UNIT

| 31 29 28 | 27 23 | 22 | 7 6 5 | 4 3 2 | 1 | 0 |
|---|---|---|---|---|---|---|
| CREG | Z | DST | CST | 1 0 0 | S | P |
| 3 | | 5 | 16 | | | |

FIG. 3H BITFIELD OPERATIONS (IMMEDIATE FORMS) ON THE .S UNIT

| 31 29 28 | 27 23 | 22 18 | 17 13 | 12 8 | 7 6 | 5 4 3 | 2 | 1 | 0 |
|---|---|---|---|---|---|---|---|---|---|
| CREG | Z | DST | SRC2 | CSTA | CSTB | OP | 0 0 1 0 | S | P |
| 3 | | 5 | 5 | 5 | 5 | 2 | | | |

FIG. 3I MVK AND MVKH ON THE .S UNIT

| 31 29 28 | 27 23 | 22 | 7 6 | 5 4 3 2 | 1 | 0 |
|---|---|---|---|---|---|---|
| CREG | Z | DST | CST | H | 1 0 1 0 | S | P |
| 3 | | 5 | 16 | | | |

FIG. 3J BCOND DISP ON THE .S UNIT

| 31 29 28 | 27 | 7 6 5 | 4 3 2 | 1 | 0 |
|---|---|---|---|---|---|
| CREG | Z | CST | 0 0 1 0 | 0 | S | P |
| 3 | | 21 | | | |

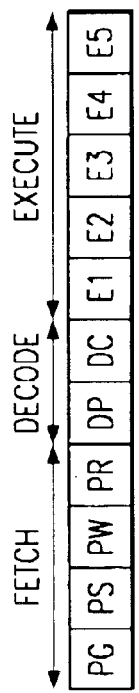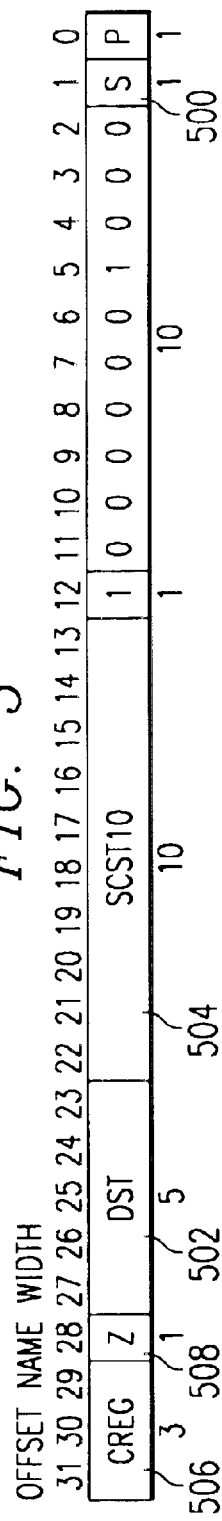

MICROPROCESSOR WITH BRANCH-DECREMENT INSTRUCTION THAT PROVIDES A TARGET AND CONDITIONALLY MODIFIES A TEST REGISTER IF THE REGISTER MEETS A CONDITION

This application claims priority under 35 USC §119(e)(1) of Provisional Application No. 60/183,527, filed Feb. 18, 2000.

NOTICE (C) Copyright 2000. Texas Instruments Incorporated. A portion of the disclosure of this patent document contains material which is subject to copyright protection. The copyright owner has no objection to the facsimile reproduction by anyone of the patent disclosure, as it appears in the Patent and Trademark Office patent file or records, but otherwise reserves all copyright rights whatsoever.

TECHNICAL FIELD OF THE INVENTION

This invention relates to data processing devices, electronic processing and control systems and methods of their manufacture and operation, and particularly relates to microprocessors optimized for digital signal processing.

BACKGROUND OF THE INVENTION

Generally, a microprocessor is a circuit that combines the instruction-handling, arithmetic, and logical operations of a computer on a single semiconductor integrated circuit. Microprocessors can be grouped into two general classes, namely general-purpose microprocessors and special-purpose microprocessors. General-purpose microprocessors are designed to be programmable by the user to perform any of a wide range of tasks, and are therefore often used as the central processing unit (CPU) in equipment such as personal computers. Special-purpose microprocessors, in contrast, are designed to provide performance improvement for specific predetermined arithmetic and logical functions for which the user intends to use the microprocessor. By knowing the primary function of the microprocessor, the designer can structure the microprocessor architecture in such a manner that the performance of the specific function by the special-purpose microprocessor greatly exceeds the performance of the same function by a general-purpose microprocessor regardless of the program implemented by the user.

One such function that can be performed by a special-purpose microprocessor at a greatly improved rate is digital signal processing. Digital signal processing generally involves the representation, transmission, and manipulation of signals, using numerical techniques and a type of special-purpose microprocessor known as a digital signal processor (DSP). Digital signal processing typically requires the manipulation of large volumes of data, and a digital signal processor is optimized to efficiently perform the intensive computation and memory access operations associated with this data manipulation. For example, computations for performing Fast Fourier Transforms (FFTs) and for implementing digital filters consist to a large degree of repetitive operations such as multiply-and-add and multiple-bit-shift. DSPs can be specifically adapted for these repetitive functions, and provide a substantial performance improvement over general-purpose microprocessors in, for example, real-time applications such as image and speech processing.

DSPs are central to the operation of many of today's electronic products, such as high-speed modems, high-density disk drives, digital cellular phones, complex automotive systems, and video-conferencing equipment. DSPs will enable a wide variety of other digital systems in the future, such as video-phones, network processing, natural speech interfaces, and ultra-high speed modems. The demands placed upon DSPs in these and other applications continue to grow as consumers seek increased performance from their digital products, and as the convergence of the communications, computer and consumer industries creates completely new digital products.

Microprocessor designers have increasingly endeavored to exploit parallelism to improve performance. One parallel architecture that has found application in some modern microprocessors utilizes multiple instruction fetch packets and multiple instruction execution packets with multiple functional units.

Digital systems designed on a single integrated circuit are referred to as an application specific integrated circuit (ASIC). MegaModules are being used in the design of ASICs to create complex digital systems a single chip. (MegaModule is a trademark of Texas Instruments Incorporated.) Types of MegaModules include SRAMs, FIFOs, register files, RAMs, ROMs, universal asynchronous receiver-transmitters (UARTs), programmable logic arrays and other such logic circuits. MegaModules are usually defined as integrated circuit modules of at least 500 gates in complexity and having a complex ASIC macro function. These MegaModules are predesigned and stored in an ASIC design library. The MegaModules can then be selected by a designer and placed within a certain area on a new IC chip.

Designers have succeeded in increasing the performance of DSPs, and microprocessors in general, by increasing clock speeds, by removing data processing bottlenecks in circuit architecture, by incorporating multiple execution units on a single processor circuit, and by developing optimizing compilers that schedule operations to be executed by the processor in an efficient manner. The increasing demands of technology and the marketplace make desirable even further structural and process improvements in processing devices, application systems and methods of operation and manufacture.

SUMMARY OF THE INVENTION

An illustrative embodiment of the present invention seeks to provide a microprocessor, and a method for operating a microprocessor that improves digital signal processing performance. Aspects of the invention are specified in the claims.

In an embodiment of the present invention, a digital signal processor is provided which has an instruction for conditionally branching based on the contents of a specified test register. Each time a branch is taken, the register is decremented as a side effect of executing the branch instruction.

In another embodiment of the invention, a predicate register and a test register is specified by the instruction. A branch occurs only if both registers meet specified conditions. One of the specified registers is decremented as a side effect of executing the branch instruction.

BRIEF DESCRIPTION OF THE DRAWINGS

Other features and advantages of the present invention will become apparent by reference to the following detailed description when considered in conjunction with the accompanying drawings, in which:

FIGS. 3A–3J show an opcode map for the DSP of FIG. 1;

FIG. 4 is a timing diagram illustrating instruction execution pipeline phase of the processor of FIG. 1;

FIG. 5 illustrates an instruction syntax for a branch and decrement (BDEC) instruction;

FIG. 6A illustrates instruction pipeline operation during execution of a BDEC instruction;

DETAILED DESCRIPTION OF EMBODIMENTS OF THE INVENTION

Figure 1:
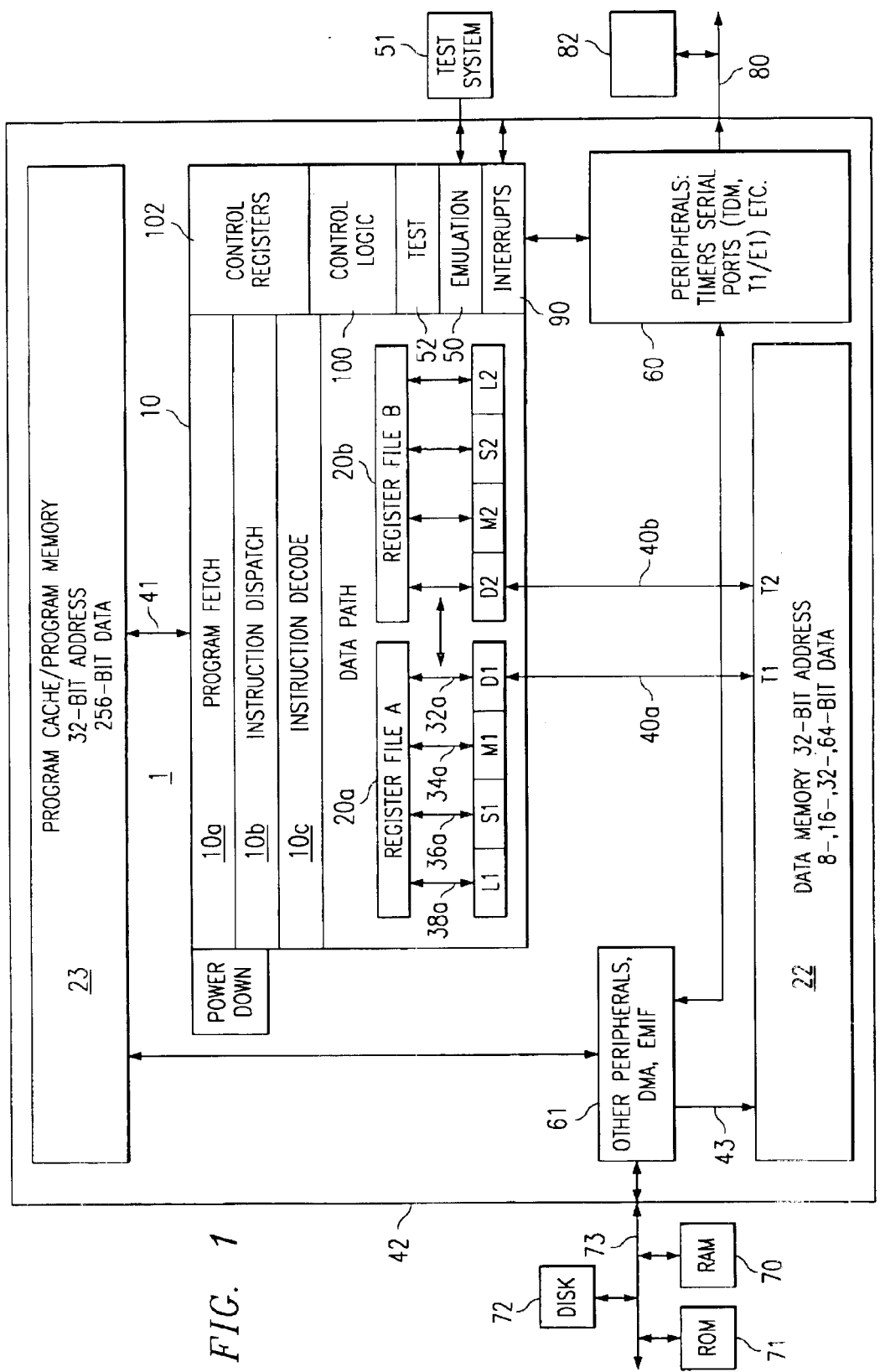
FIG. 1 is a block diagram of a digital signal processor (DSP), showing components thereof pertinent to an embodiment of the present invention.

FIG. 1 is a block diagram of a microprocessor 1 which has an embodiment of the present invention. Microprocessor 1 is a VLIW digital signal processor ("DSP"). In the interest of clarity, FIG. 1 only shows those portions of microprocessor 1 that are relevant to an understanding of an embodiment of the present invention. Details of general construction for DSPs are well known, and may be found readily elsewhere. For example, U.S. Pat. No. 5,072,418 issued to Frederick Boutaud, et al, describes a DSP in detail and is incorporated herein by reference. U.S. Pat. No. 5,329,471 issued to Gary Swoboda, et al, describes in detail how to test and emulate a DSP and is incorporated herein by reference. Details of portions of microprocessor 1 relevant to an embodiment of the present invention are explained in sufficient detail hereinbelow, so as to enable one of ordinary skill in the microprocessor art to make and use the invention.

In microprocessor 1 there are shown a central processing unit (CPU) 10, data memory 22, program memory 23, peripherals 60 and an external memory interface (EMIF) with a direct memory access (DMA) 61. CPU 10 further has an instruction fetch/decode unit 10a-c, a plurality of execution units, including an arithmetic and load/store unit D1, a multiplier M1, an ALU/shifter unit S1, an arithmetic logic unit ("ALU") L1, a shared multi-port register file 20a from which data are read and to which data are written. Decoded instructions are provided from the instruction fetch/decode unit 10a-c to the functional units D1, M1, S1, and L1 over various sets of control lines which are not shown. Data are provided to/from the register file 20a from/to to load/store unit D1 over a first set of busses 32a, to multiplier M1 over a second set of busses 34a, to ALU/shifter unit S1 over a third set of busses 36a and to ALU L1 over a fourth set of busses 38a. Data are provided to/from the memory 22 from/to the load/store unit D1 via a fifth set of busses 40a. Note that the entire data path described above is duplicated with register file 20b and execution units D2, M2, S2, and L2. Load/store unit D2 similarly interfaces with memory 22 via a set of busses 40b. In this embodiment of the present invention, two unrelated aligned double word (64 bits) load/store transfers can be made in parallel between CPU 10 and data memory 22 on each clock cycle using bus set 40a and bus set 40b.

A single non-aligned double word load/store transfer is performed by scheduling a first .D unit resource and two load/store ports on memory 22. Advantageously, an extraction circuit is connected to the memory subsystem to provide a non-aligned data item extracted from two aligned data items requested by the .D unit. Advantageously, a second .D unit can perform 32-bit logical or arithmetic instructions in addition to the .S and .L units while the address port of the second .D unit is being used to transmit one of two contiguous addresses provided by the first .D unit. Furthermore, a non-aligned access near the end of a circular buffer region in the target memory provides a non-aligned data item that wraps around to the other end of the circular buffer.

Emulation circuitry 50 provides access to the internal operation of integrated circuit 1 that can be controlled by an external test/development system (XDS) 51. External test system 51 is representative of a variety of known test systems for debugging and emulating integrated circuits. One such system is described in U.S. Pat. No. 5,535,331 which is incorporated herein by reference. Test circuitry 52 contains control registers and parallel signature analysis circuitry for testing integrated circuit 1.

Note that the memory 22 and memory 23 are shown in FIG. 1 to be a part of a microprocessor 1 integrated circuit, the extent of which is represented by the box 42. The memories 22–23 could just as well be external to the microprocessor 1 integrated circuit 42, or part of it could reside on the integrated circuit 42 and part of it be external to the integrated circuit 42. These are matters of design choice. Also, the particular selection and number of execution units are a matter of design choice, and are not critical to the invention.

When microprocessor 1 is incorporated in a data processing system, additional memory or peripherals may be connected to microprocessor 1, as illustrated in FIG. 1. For example, Random Access Memory (RAM) 70, a Read Only Memory (ROM) 71 and a Disk 72 are shown connected via an external bus 73. Bus 73 is connected to the External Memory Interface (EMIF) which is part of functional block 61 within microprocessor 42. A Direct Memory Access (DMA) controller is also included within block 61. The DMA controller part of functional block 61 connects to data memory 22 via bus 43 and is generally used to move data between memory and peripherals within microprocessor 1 and memory and peripherals which are external to microprocessor 1.

In the present embodiment, CPU core 10 is encapsulated as a MegaModule, however, other embodiments of the present invention may be in custom designed CPU's or mass market microprocessors, for example.

A detailed description of various architectural features of the microprocessor of FIG. 1 is provided in coassigned U.S. Pat. No. 6,182,203 and is incorporated herein by reference. A description of enhanced architectural features and an extended instruction set not described herein for CPU 10 is provided in coassigned U.S. Patent application Ser. No. 09/703,096 Microprocessor with Improved Instruction Set Architecture and is incorporated herein by reference.

Figure 2:
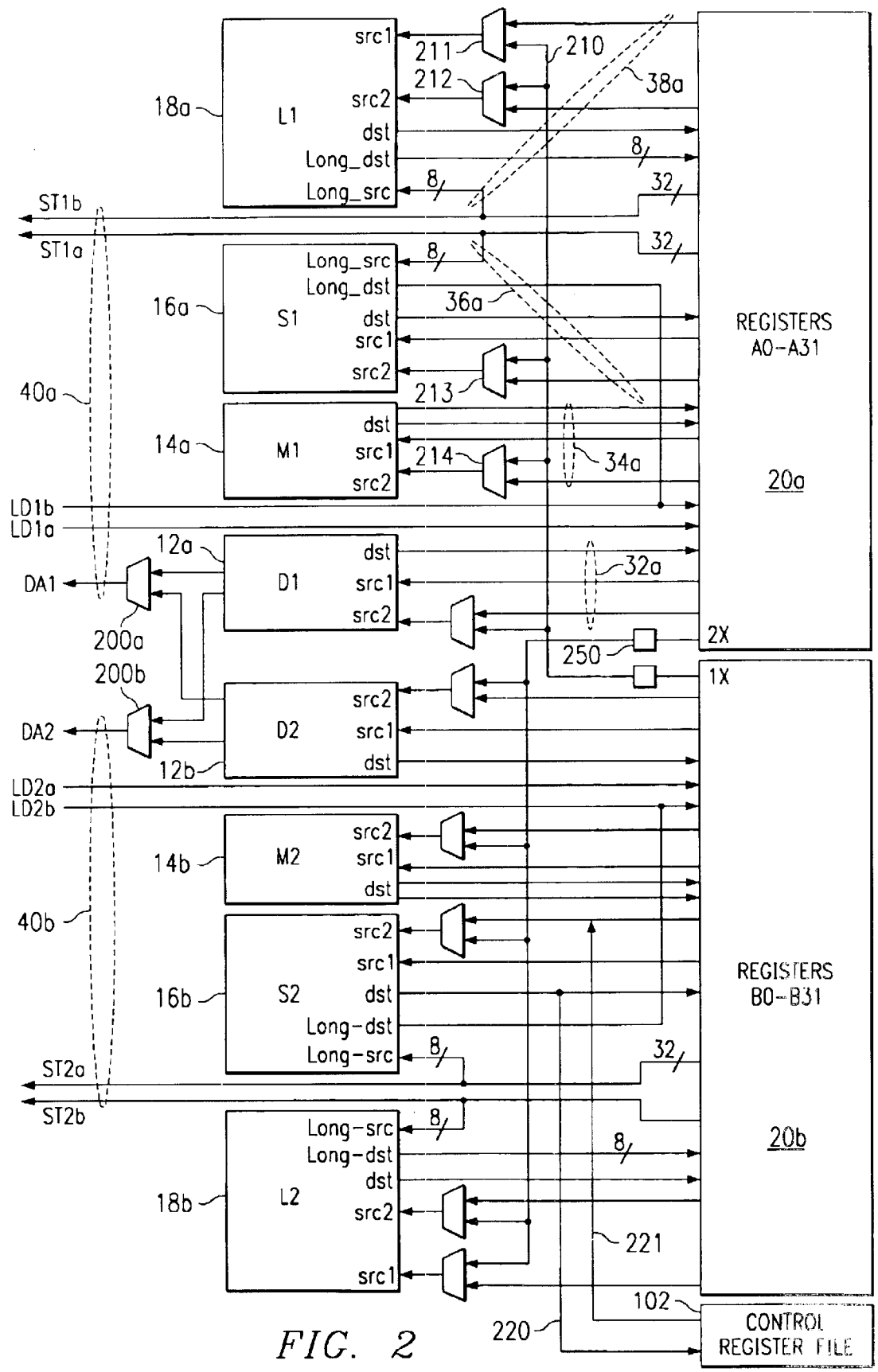
FIG. 2 is a block diagram of the functional units, data paths and register files of FIG. 1.

FIG. 2 is a block diagram of the execution units and register files of the microprocessor of FIG. 1 and shows a more detailed view of the buses connecting the various functional blocks. In this figure, all data busses are 32 bits wide, unless otherwise noted. There are two general-purpose register files (A and B) in the processor's data paths. Each of these files contains 32 32-bit registers (A0–A31 for register file A 20a and B0–B31 for register file B 20b). The general-purpose registers can be used for data, data address pointers, or condition registers. Any number of reads of a given register can be performed in a given cycle.

The general-purpose register files support data ranging in size from packed 8-bit data through 64-bit fixed-point data. Values larger than 32 bits, such as 40-bit long and 64-bit double word quantities, are stored in register pairs, with the 32 LSBs of data placed in an even-numbered register and the remaining 8 or 32 MSBs in the next upper register (which is always an odd-numbered register). Packed data types store either four 8-bit values or two 16-bit values in a single 32-bit register.

There are 32 valid register pairs for 40-bit and 64-bit data, as shown in Table 1. In assembly language syntax, a colon between the register names denotes the register pairs and the odd numbered register is encoded in the instruction opcode.

TABLE 1

40-Bit/64-Bit Register Pairs
Register Files

| A | B |
|---|---|
| A1:A0 | B1:B0 |
| A3:A2 | B3:B2 |
| A5:A4 | B5:B4 |
| A7:A6 | B7:B6 |
| A9:A8 | B9:B8 |
| A11:A10 | B11:B10 |
| A13:A12 | B13:B12 |
| A15:A14 | B15:B14 |
| A17:A16 | B17:B16 |
| A19:A18 | B19:B18 |
| A21:A20 | B21:B20 |
| A23:A22 | B23:B22 |
| A25:A24 | B25:B24 |
| A27:A26 | B27:B26 |
| A29:A28 | B29:B28 |
| A31:A30 | B31:B30 |

For 40-bit data, operations requiring a long input ignore the 24 MSBs of the odd register. Operations producing a long result zero-fill the 24 MSBs of the odd register. The even register is encoded in the opcode.

The eight functional units in processor 10's data paths are be divided into two groups of four; each functional unit in one data path is almost identical to the corresponding unit in the other data path. The functional units are described in Table 2.

Besides being able to perform 32-bit data manipulations, processor 10 also contains many 8-bit and 16-bit data instructions in the instruction set. For example, the MPYU4 instruction performs four 8×8 unsigned multiplies with a single instruction on a .M unit. The ADD4 instruction performs four 8-bit additions with a single instruction on a .L unit.

TABLE 2

Functional Units and Operations Performed

| Functional Unit | Fixed-Point Operations |
|---|---|
| .L unit (.L1, .L2) | 32/40-bit arithmetic and compare operations |
| | 32-bit logical operations |
| | Leftmost 1 or 0 counting for 32 bits |
| | Normalization count for 32 and 40 bits |
| | Byte shifts |
| | Data packing/unpacking |
| | 5-bit constant generation |
| | Paired 16-bit arithmetic operations |
| | Quad 8-bit arithmetic operations |
| | Paired 16-bit min/max operations |
| | Quad 8-bit min/max operations |

TABLE 2-continued

Functional Units and Operations Performed

| Functional Unit | Fixed-Point Operations |
|---|---|
| .S unit (.S1, .S2) | 32-bit arithmetic operations |
| | 32/40-bit shifts and 32-bit bit-field operations |
| | 32-bit logical operations |
| | Branches |
| | Constant generation |
| | Register transfers to/from control register file (.S2 only) |
| | Byte shifts |
| | Data packing/unpacking |
| | Paired 16-bit compare operations |
| | Quad 8-bit compare operations |
| | Paired 16-bit shift operations |
| | Paired 16-bit saturated arithmetic operations |
| | Quad 8-bit saturated arithmetic operations |
| .M unit (.M1, .M2) | 16 × 16 multiply operations |
| | 16 × 32 multiply operations |
| | Bit expansion |
| | Bit interleaving/de-interleaving |
| | Quad 8 × 8 multiply operations |
| | Paired 16 × 16 multiply operations |
| | Paired 16 × 16 multiply with add/subtract operations |
| | Quad 8 × 8 multiply with add operations |
| | Variable shift operations |
| | Rotation |
| | Galois Field Multiply |
| .D unit (.D1, .D2) | 32-bit add, subtract, linear and circular address calculation |
| | Loads and stores with 5-bit constant offset |
| | Loads and stores with 15-bit constant offset (.D2 only) |
| | Load and store double words with 5-bit constant |
| | Load and store non-aligned words and double words |
| | 5-bit constant generation |
| | 32-bit logical operations |

Most data lines in the CPU support 32-bit operands, and some support long (40-bit) and double word (64-bit) operands. Each functional unit has its own 32-bit write port into a general-purpose register file (Refer to FIG. 2). All units ending in 1 (for example, .L1) write to register file A 20a and all units ending in 2 write to register file B 20b. Each functional unit has two 32-bit read ports for source operands src1 and src2. Four units (.L1, .L2, .S1, and .S2) have an extra 8-bit-wide port for 40-bit long writes, as well as an 8-bit input for 40-bit long reads. Because each unit has its own 32-bit write port, when performing 32-bit operations all eight units can be used in parallel every cycle. Since each multiplier can return up to a 64-bit result, two write ports (dst1 and dst2) are provided from the multipliers to the respective register file.

Register File Cross Paths

Each functional unit reads directly from and writes directly to the register file within its own data path. That is, the .L1 unit 18a, .S1 unit 16a, .D1 unit 12a, and .M1 unit 14a write to register file A 20a and the .L2 unit 18b, .S2 unit 16b, .D2 unit 12b, and .M2 unit 14b write to register file B 20b. The register files are connected to the opposite-side register file's functional units via the 1× and 2×cross paths. These cross paths allow functional units from one data path to access a 32-bit operand from the opposite side's register file. The 1× cross path allows data path A's functional units to read their source from register file B. Similarly, the 2× cross path allows data path B's functional units to read their source from register file A.

All eight of the functional units have access to the opposite side's register file via a cross path. The .M1, .M2, S1, .S2, .D1, and .D2 units' src2 inputs are selectable between the cross path and the same side register file. In the case of the .L1 and .L2 both src1 and src2 inputs are also selectable between the cross path and the same-side register file. Cross path 1× bus 210 couples one input of multiplexer 211 for src1 input of .L1 unit 18a, multiplexer 212 for src2 input of .L1 unit 18a, multiplexer 213 for src2 input of .S1 unit 16a and multiplexer 214 for scr2 input of .M1 unit 14a. Multiplexers 211, 212, 213, and 214 select between the cross path 1× bus 210 and an output of register file A 20a. Buffer 250 buffers cross path 2×output to similar multiplexers for .L2, .S2, .M2, and .D2 units.

Only two cross paths, 1× and 2×, exist in this embodiment of the architecture. Thus the limit is one source read from each data path's opposite register file per cycle, or a total of two cross-path source reads per cycle. Advantageously, multiple units on a side may read the same cross-path source simultaneously. Thus the cross path operand for one side may be used by any one, multiple or all the functional units on that side in an execute packet. In the C62x/C67x, only one functional unit per data path, per execute packet could get an operand from the opposite register file.

A delay clock cycle is introduced whenever an instruction attempts to read a register via a cross path that was updated in the previous cycle. This is known as a cross path stall. This stall is inserted automatically by the hardware; no NOP instruction is needed. It should be noted that no stall is introduced if the register being read is the destination for data loaded by a LDx instruction.

S2 unit 16b may write to control register file 102 from its dst output via bus 220. S2 unit 16b may read from control register file 102 to its src2 input via bus 221.

Memory, Load and Store Paths

Processor 10 supports double word loads and stores. There are four 32-bit paths for loading data for memory to the register file. For side A, LD1a is the load path for the 32 LSBs; LD1b is the load path for the 32 MSBs. For side B, LD2a is the load path for the 32 LSBs; LD2b is the load path for the 32 MSBs. There are also four 32-bit paths, for storing register values to memory from each register file. ST1a is the write path for the 32 LSBs on side A; ST1b is the write path for the 32 MSBs for side A. For side B, ST2a is the write path for the 32 LSBs; ST2b is the write path for the 32 MSBs.

Some of the ports for long and double word operands are shared between functional units. This places a constraint on which long or double word operations can be scheduled on a datapath in the same execute packet.

Data Address Paths

Bus 40a has an address bus DA1 which is driven by mux 200a. This allows an address generated by either load/store unit D1 or D2 to provide a memory address for loads or stores for register file 20a. Data Bus LD1 loads data from an address in memory 22 specified by address bus DA1 to a register in load unit D1. Unit D1 may manipulate the data provided prior to storing it in register file 20a. Likewise, data bus ST1 stores data from register file 20a to memory 22. Load/store unit D1 performs the following operations: 32-bit add, subtract, linear and circular address calculations. Load/store unit D2 operates similarly to unit D1 via bus 40b, with the assistance of mux 200b for selecting an address.

The DA1 and DA2 resources and their associated data paths are specified as T1 and T2 respectively. T1 consists of the DA1 address path and the LD1a, LD1b, ST1a and ST1b data paths. Similarly, T2 consists of the DA2 address path and the LD2a, LD2b, ST2a and ST2b data paths. The T1 and T2 designations appear in functional unit fields for load and store instructions.

For example, the following load instruction uses the .D1 unit to generate the address but is using the LD2a path resource from DA2 to place the data in the B register file. The use of the DA2 resource is indicated with the T2 designation, for example: LDW .D1T2 *A0[3], B1.

Table 3 defines the mapping between instructions and functional units for a set of basic instructions included in DSP 10 is described in U.S. Patent No. 6,182,203 incorporated herein by reference). Table 4 defines a mapping between instructions and functional units for a set of extended instructions in an embodiment of the present invention. Alternative embodiments of the present invention may have different sets of instructions and functional unit mapping. Table 3 and Table 4 are illustrative and are not exhaustive or intended to limit various embodiments of the present invention.

TABLE 3

Instruction to Functional Unit Mapping of Basic Instructions

| .L Unit | .M Unit | .S Unit | .D Unit |
| --- | --- | --- | --- |
| ABS | MPY | ADD | ADD |
| ADD | SMPY | ADDK | ADDA |
| AND | | ADD2 | LD mem |
| CMPEQ | | AND | LD mem (15-bit offset) (D2 only) |
| CMPGT | | B disp | MV |
| CMPGTU | | B IRP | NEG |
| CMPLT | | B NRP | ST mem |
| CMPLTU | | B reg | ST mem (15-bit offset) (D2 only) |
| LMBD | | CLR | SUB |
| MV | | EXT | SUBA |
| NEG | | EXTU | ZERO |
| NORM | | MVC | |
| NOT | | MV | |
| OR | | MVK | |
| SADD | | MVKH | |
| SAT | | NEG | |
| SSUB | | NOT | |
| SUB | | OR | |
| SUBC | | SET | |
| XOR | | SHL | |
| ZERO | | SHR | |
| | | SHRU | |
| | | SSHL | |
| | | STP (S2 only) | |
| | | SUB | |
| | | SUB2 | |
| | | XOR | |
| | | ZERO | |

TABLE 4

Instruction to Functional Unit Mapping of Extended Instructions

| .L unit | .M unit | .S unit | .D unit |
| --- | --- | --- | --- |
| ABS2 | AVG2 | ADD2 | ADD2 |
| ADD2 | AVGU4 | ADDKPC | AND |
| ADD4 | BITC4 | AND | ANDN |
| AND | BITR | ANDN | LDDW |
| ANDN | DEAL | BDEC | LDNDW |
| MAX2 | DOTP2 | BNOP | LDNW |
| MAXU4 | DOTPN2 | BPOS | MVK |
| MIN2 | DOTPNRSU2 | CMPEQ2 | OR |
| MINU4 | DOTPNRUS2 | CMPEQ4 | STDW |
| | DOTPRSU2 | CMPGT2 | |
| | DOTPRUS2 | CMPGTU4 | |
| MVK | DOTPSU4 | CMPLT2 | STNDW |
| | DOTPUS4 | | |
| OR | DOTPU4 | CMPLTU4 | STNW |
| PACK2 | GMPY4 | MVK | SUB2 |
| PACKH2 | MPY2 | OR | XOR |
| PACKH4 | MPYHI | PACK2 | |
| PACKHL2 | MPYHIR | PACKH2 | |
| | MPYIH | | |
| | MPYIHR | | |

TABLE 4-continued

Instruction to Functional Unit Mapping of Extended Instructions

| .L unit | .M unit | .S unit | .D unit |
|---|---|---|---|
| PACKL4 | MPYIL | PACKHL2 | |
| | MPYILR | | |
| | MPYLI | | |
| PACKLH2 | MPYLIR | PACKLH2 | |
| SHLMB | MPYSU4 | SADD2 | |
| | MPYUS4 | | |
| SHRMB | MPYU4 | SADDU4 | |
| SUB2 | MVD | SADDSU2 | |
| | | SADDUS2 | |
| SUB4 | ROTL | SHLMB | |
| SUBABS4 | SHFL | SHR2 | |
| SWAP2 | SMPY2 | SHRMB | |
| SWAP4 | SSHVL | SHRU2 | |
| UNPKHU4 | SSHVR | SPACK2 | |
| UNPKLU4 | XPND2 | SPACKU4 | |
| XOR | XPND4 | SUB2 | |
| | | SWAP2 | |
| | | UNPKHU4 | |
| | | UNPKLU4 | |
| | | XOR | |

The DSP's opcode map is shown in FIGS. 3A–3J. Refer to the instruction descriptions later herein for explanations of the field syntax and values. An instruction syntax is used to describe each instruction. The opcode map breaks down the various bit fields that make up each instruction. There are certain instructions that can be executed on more than one functional unit, as was shown in Table 4. The syntax specifies the functional unit and various resources used by an instruction, typically as follows:

EXAMPLE (.unit) src, dst

The following are examples of what the syntax looks like for the ADD instruction:

1) ADD (.unit) src1, src2, dst
2) ADDU (.unit) src1, src2, dst
3) ADD (.unit) src2, src1, dst unit=.L1, .L2, S1, .S2, .D1, .D2 src and dst indicate source and destination respectively. The (.unit) dictates which functional unit the instruction is mapped to (.L1, .L2, .S1, .S2, .M1, .M2, .D1, or .D2). This instruction has three opcode map fields: src1, src2, and dst.

The addressing modes for instructions that access memory are linear, circular using BK0, and circular using BK1. The mode is specified by an addressing mode register (AMR) contained in control register file 102. Eight registers can perform circular addressing. A4–A7 are used by the .D1 unit and B4–B7 are used by the .D2 unit. No other units can perform circular addressing modes. For each of these registers, the AMR specifies the addressing mode.

All instructions can be conditional. The condition is controlled by a 3-bit (creg) field specifying a register to be tested, and a 1-bit field (z) specifying a test for zero or nonzero, as shown in FIGS. 3A–3J. The four MSBs of every opcode are creg and z. The specified register is tested at the beginning of the D1 instruction execution pipeline stage for all instructions. The pipeline is described later herein. If z=1, the test is for equality with zero. If z=0, the test is for nonzero. The case of condition register field (creg)=0 and z=0 is treated as always true to allow instructions to be executed unconditionally. The creg register field is encoded as shown in Table 5. Conditional instructions are represented by "[ ]" surrounding the condition register.

TABLE 5

Registers That Can Be Tested by Conditional Operations

| Creg | | | z | Register Tested |
|---|---|---|---|---|
| 31 | 30 | 29 | 28 | |
| 0 | 0 | 0 | 0 | Unconditional. |
| 0 | 0 | 0 | 1 | Reserved: When selected this indicates a SWBP instruction |
| 0 | 0 | 1 | z | B0 |
| 0 | 1 | 0 | z | B1 |
| 0 | 1 | 1 | z | B2 |
| 1 | 0 | 0 | z | |
| 1 | 0 | 0 | z | A1 |
| 1 | 0 | 1 | z | A2 |
| 1 | 1 | x | x | Reserved |

Note: x is don't care for reserved cases.

Instructions are always fetched eight at a time. This constitutes a fetch packet. The execution grouping of the fetch packet is specified by the p-bit, bit zero, of each instruction. Fetch packets are 8-word aligned.

The p bit controls the parallel execution of instructions. The p bits are scanned from left to right (lower to higher address). If the p bit of instruction i is 1, then instruction i+1 is to be executed in parallel with (in the same cycles as) instruction i. If the p-bit of instruction i is 0, then instruction i+1 is executed in the cycle after instruction i. All instructions executing in parallel constitute an execute packet. An execute packet can contain up to eight instructions. All instructions in an execute packet must use a unique functional unit.

Pipeline Operation

The DSP pipeline has several key features which improve performance, decrease cost, and simplify programming. They are: increased pipelining eliminates traditional architectural bottlenecks in program fetch, data access, and multiply operations; control of the pipeline is simplified by eliminating pipeline interlocks; the pipeline can dispatch eight parallel instructions every cycle; parallel instructions proceed simultaneously through the same pipeline phrases; sequential instructions proceed with the same relative pipeline phase difference; and load and store addresses appear on the CPU boundary during the same pipeline phase, eliminating read-after-write memory conflicts.

A multi-stage memory pipeline is present for both data accesses and program fetches. This allows use of high-speed synchronous memories both on-chip and off-chip, and allows infinitely nestable zero-overhead looping with branches in parallel with other instructions.

There are no internal interlocks in the execution cycles of the pipeline, so a new execute packet enters execution every CPU cycle. Therefore, the number of CPU cycles for a particular algorithm with particular input data is fixed. If during program execution, there are no memory stalls, the number of CPU cycles equals the number of clock cycles for a program to execute.

Performance can be inhibited by stalls from the memory system, stalls for cross path dependencies, or interrupts. The reasons for memory stalls are determined by the memory architecture. Cross path stalls are described in detail in U.S. patent application Ser. No. 09/702,453, to Steiss, et al and is incorporated herein by reference. To fully understand how to optimize a program for speed, the sequence of program fetch, data store, and data load requests the program makes, and how they might stall the CPU should be understood.

The pipeline operation, from a functional point of view, is based on CPU cycles. A CPU cycle is the period during which a particular execute packet is in a particular pipeline stage. CPU cycle boundaries always occur at clock cycle boundaries; however, stalls can cause CPU cycles to extend over multiple clock cycles. To understand the machine state at CPU cycle boundaries, one must be concerned only with the execution phases (E1–E5) of the pipeline. The phases of the pipeline are shown in FIG. 4 and described in Table 6.

TABLE 6

Pipeline Phase Description

| Pipeline | Pipeline Phase | Symbol | During This Phase | Instruction Types Completed |
|---|---|---|---|---|
| Program Fetch | Program Address Generate | PG | Address of the fetch packet is determined. | |
| | Program Address Send | PS | Address of fetch packet is sent to memory. | |
| | Program Wait | PW | Program memory access is performed. | |
| | Program Data Receive | PR | Fetch packet is expected at CPU boundary. | |
| Program Decode | Dispatch | DP | Next execute packet in fetch packet determined and sent to the appropriate functional units to be decoded. | |
| | Decode | DC | Instructions are decoded at functional units. | |
| Execute | Execute 1 | E1 | For all instruction types, conditions for instructions are evaluated and operands read. Load and store instructions: address generation is computed and address modifications written to register file† Branch instructions: affects branch fetch packet in PG phase† Single-cycle instructions: results are written to a register file† | Single-cycle |
| | Execute 2 | E2 | Load instructions: address is sent to memory† Store instructions and STP: address and data are sent to memory† Single-cycle instructions that saturate results set the SAT bit in the Control Status Register (CSR) if saturation occurs.† Multiply instructions: results are written to a register file† | Stores STP Multiplies |
| | Execute 3 | E3 | Data memory accesses are performed. Any multiply instruction that saturates results sets the SAT bit in the Control Status Register (CSR) if saturation occurs.† | |
| | Execute 4 | E4 | Load instructions: data is brought to CPU boundary† | |
| | Execute 5 | E5 | Load instructions: data is loaded into register† | Loads |

†This assumes that the conditions for the instructions are evaluated as true. If the condition is evaluated as false, the instruction will not write any results or have any pipeline operation after E1.

Referring again to FIG. 4 and FIG. 1, the instruction execution pipeline of processor 10 involves a number of discrete stages, generally demarcated by temporary latches or registers to pass the results of one stage to the next. Instruction pipeline phases PG, PS, PW, and PR all involve instruction fetching and are embodied in program fetch circuit 10 in association with program memory subsystem 23. Pipeline phases DP and DC involve instruction decoding; phase DP is embodied in dispatch circuitry 10b, while pipeline phase DC is embodied in decode circuitry 10c. The execution phases E1–E5 are embodied in stages embodied within each functional unit L, S, M and D. For example, the D units embody all five execute stage in association with memory subsystem 22. Other of the functional units do not embody all five execution phase, but only what is required for the instruction types that are executed by a particular functional unit.

The execution of instructions can be defined in terms of delay slots, as shown in Table 7. A delay slot is a CPU cycle that occurs after the first execution phase (E1) of an instruction in which results from the instruction are not available. For example, a multiply instruction has 1 delay slot, this means that there is 1 CPU cycle before another instruction can use the results from the multiply instruction.

TABLE 7

Delay Slot Summary

| Instruction Type | Delay Slots | Execute Stages Used |
|---|---|---|
| Branch (The cycle when the target enters E1) | 5 | E1-branch target E1 |
| Load (LD) (Incoming Data) | 4 | E1–E5 |
| Load (LD) (Address Modification) | 0 | E1 |
| Multiply | 1 | E1–E2 |
| Single-cycle | 0 | E1 |
| Store | 0 | E1 |
| NOP (no execution pipeline operation) | — | — |
| STP (no CPU internal results written) | — | — |

Single cycle instructions execute during the E1 phase of the pipeline.

The operand is read, operation is performed and the results are written to a register all during E1. These instructions have no delay slots.

Multiply instructions complete their operations during the E2 phase of the pipeline. In the E1 phase, the operand is read and the multiply begins. In the E2 phase, the multiply finishes, and the result is written to the destination (dst) register. Multiply instructions have 1 delay slot.

Load instructions have two results: data loaded from memory and address pointer modification.

Data loads complete their operations during the E5 phase of the pipeline. In the E1 phase, the address of the data is computed. In the E2 phase, the data address is sent to data memory. In the E3 phase, a memory read is performed. In the E4 stage, the data is received at the CPU core boundary. Finally, in the E5 phase, the data is loaded into a register. Because data is not written to the register unit E5, these instructions have 4 delay slots. Because pointer results are written to the register in E1, there are no delay slots associated with the address modification.

Store instructions complete their operations during the E3 phase of the pipeline. In the E1 phase, the address of the data is computed. In the E2 phase, the data address is sent to data memory. In the E3 phase, a memory write is performed. The address modification is performed in the E1 stage of the pipeline. Even though stores finish their execution in the E3 phase of the pipeline, they have no delay slots and follow the following rules (i=cycle):

1) When a load is executed before a store, the old value is loaded and the new value is stored.
2) When a store is executed before a load, the new value is stored and the new value is loaded.
3) When the instructions are in are in parallel, the old value is loaded and the new value is stored.

Branch with Decrement Instruction

An aspect of the present invention is that the DSP of FIG. 1 includes a conditional branch instruction that advantageously reduces the number of instructions required to perform an iterative looping operation. By so doing, performance of the processor is improved.

FIG. 5 illustrates an instruction syntax for a branch and decrement (BDEC) instruction. In this embodiment, a BDEC instruction can be executed in either .S functional unit 16a or 16b as indicated by unit select bit field 500. The instruction includes destination field (dst) 502 that selects a register from associated register file 20a or 20b that is used as a test register. For each execution of a BDEC instruction, if the test register (dst) is positive (greater than or equal to 0), the BDEC instruction performs a relative branch and decrements dst by one.

The instruction performs the relative branch using a 10-bit signed displacement constant specified by signed constant field (scst 10) 504. The constant is shifted 2 bits to the left, then added to the address of the first instruction of the fetch packet that contains the BDEC instruction. This address is maintained in an execution program counter (PCE1) within control register file 102. The result is placed in a program fetch counter (PFC) that is used by program fetch circuitry 10a to fetch the next instruction fetch packet. PCE1 (program counter E1 phase) represents the address of the first instruction of the fetch packet containing this instruction. It is the same as the address of this branch instruction truncated to a fetch packet boundary (32 bytes). Note that if the execute packet spans two fetch packets, the instructions in the second fetch packet will see the value of the PCE1 register as 32 greater than the value seen by the first instruction in the execute packet.

An assembler can calculate the displacement constant by the following formula:
disp=(address(LABEL)−(address(BDEC)& ~0x31)>>2;
if (disp>0x0000001FF||; test for greater than 2**9−1
disp<(−0x000000200)); test for less than 2**9
then assembler_error("Constant out of range disp: %x", disp)
where "address(label)" is the absolute address of the label and "address(BDEC)" is the absolute address of the BDEC instruction.

The branch operation of a BDEC instruction is only taken when the incoming test register value is not negative. The decrement operation of a BDEC instruction occurs only when the incoming test register value is not negative. The dst register is written with an update value, no matter what the initial value. When the incoming value is negative, the register is rewritten with the same value. Because the dst register is always written, BDEC cannot be paired with any other instruction that writes that register, unless the two instructions are both conditional operations that are predicated on opposite conditions, otherwise the result is undefined. Likewise, if two branches are in the same execute packet and both are taken, and the resulting exception event is masked, the behavior of processor core 10 is undefined.

As with all of the instructions executed by the DSP of FIG. 1, the BDEC instruction is conditional based on a predicate register selected by condition register field (creg) 506 and zero indicator bit 508, as discussed previously.

Table 8 defines the operation of the BDEC instruction using pseudo code. Just as with other conditionally executed instructions, if the predicate condition tests false, BDEC does not complete execution and neither the write of the dst register nor the branch occur. Advantageously, using BDEC can free predication registers for other uses.

TABLE 8

Execution of BDEC Instruction

```
if (cond) {
{ if (dst >=0), PFC = ((PCE1 + se(scst10)) << 2);
if (dst >=0), dst = dst − 1;
else nop
}
else nop
```

Figure 6B:
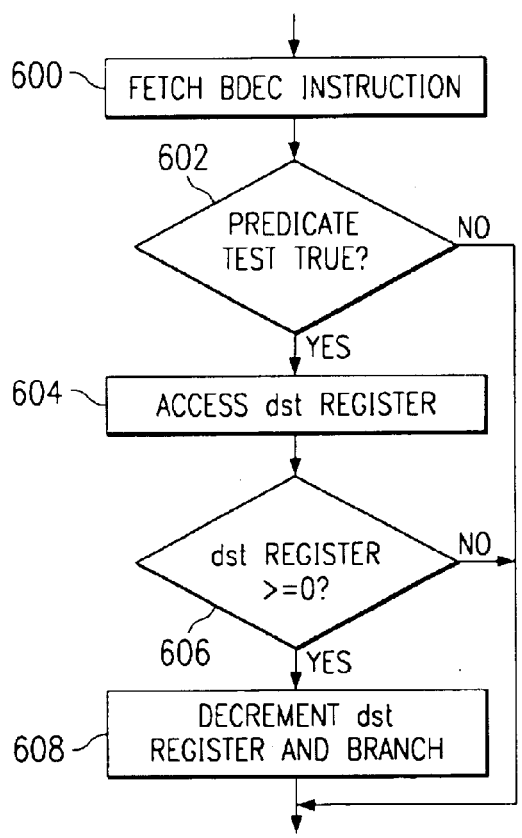
FIG. 6B is a flow chart illustrating various steps involved in the execution of a BDEC instruction.

FIG. 6A illustrates instruction pipeline operation during execution of a BDEC instruction. FIG. 6B is a flow chart illustrating various steps involved in the execution of a BDEC instruction. In step 600, a BDEC instruction is fetched, dispatched and decoded, which can be executed in either of functional units S1 or S2 16a or 16b. In step 602, a selected predicate register is tested: if the condition of the contents of the predicate register do not agree with a value specified by the z-bit, then the BDEC instruction is treated as a no-operation (NOP). That is, if the z-bit is asserted to specify a condition of "zero" then the BDEC is treated as a NOP if the contents of the predicate register does not have a value of "zero."

In step 604, a test register specified by the dst field is read during pipeline phase E1. The contents of the test register is tested in step 606 during phase E1 instruction to determine if the contents of the test register meet a certain condition. If the contents of the test register are negative, then the BDEC instruction does not take a branch and the dst register is not decremented. Test circuitry is provided within each functional unit .S to test both a predicate register selected by creg field 506 and a test register selected by destination field 502 within instruction pipeline phase E1. The results of both tests are essentially ANDed together to determine the operation of the BDEC instruction.

In step 608, the selected dst register is written with a decremented value during the same E1 phase, along with the program counter, if a branch is to be taken. Decrement circuitry is provided within each .S functional unit to decrement the selected test register during pipeline phase E1. An adder is provided within each .S functional unit to add signed displacement field 504 to the PCE1 register during pipeline phase E1.

Once the program counter (PC) is written, pipeline phase PS, PW, PR, DP, and DC are executed before a branch target instruction reaches the E1 phase, thus the BDEC instruction is categorized as having five delay slots. Interrupts are suppressed in the execute packet containing a branch instruction and in the five execute packets following a branch instruction, regardless of whether or not a the branch is taken; however, non-interrupt exceptions are not automatically suppressed in the execute containing a branch instruction or in the five execute packets following a branch instruction.

Table 9 illustrates the operation of the BDEC instruction with a positive offset, while Table 10 illustrates operation of the BDEC instruction with a negative offset. Note that since the displacement field 504 is a ten bit signed value, 300 h is a negative number.

TABLE 9

Example: BDEC .S1 100h,A10

| PCE1 | 0100 0000h | PCE1 | |
|------|------------|------|------------|
| PC   | XXXX XXXXh | PC   | 0100 0400h |
| A10  | 0000 000Ah | A10  | 0000 0009h |

TABLE 10

Example: BDEC .S1 300h,A10

| PCE1 | 0100 0000h | PCE1 | |
|------|------------|------|------------|
| PC   | XXXX XXXXh | PC   | 00FF FC00h |
| A10  | 0000 0010h | A10  | 0000 000Fh |

Table 11 contains an example instruction code sequence that illustrates a sequence of code for performing a conditional branch using register A10 as a test register. Advantageously, three instructions can be replaced by a single BDEC instruction, as shown in the Table. The BDEC instruction helps reduce the number of instructions needed to decrement a register and branch conditionally based upon that register's value. Note also that any register can be used which can free the predicate registers (A0–A2 and B0–B2) for other uses.

TABLE 11

Instruction Sequence With and Without BDEC

Instruction Sequence without BDEC

| | |
|---|---|
| CMPLT .L1 A10,0,A1 | Perform test on reg A10, put test result in reg A1 |
| [!A1] SUB .L1 A10,1,A10 | Decrement reg A10 |
| \|\| [!A1] B .S1 func | Predicate branch with reg A1 |
| NOP 5 | Delay slots |

Instruction Sequence with BDEC

| | |
|---|---|
| BDEC .S1 func,A10 | Test, decrement, and conditionally branch |
| NOP 5 | Delay slots |

Figure 7:
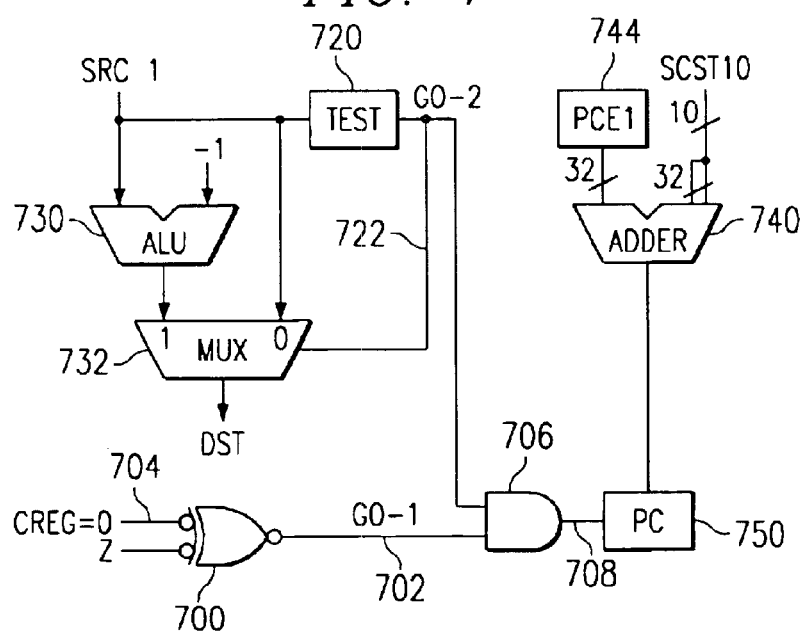
FIG. 7 is a block diagram illustrating circuitry associated with each of the .S functional units in more detail.

FIG. 7 is a block diagram illustrating circuitry associated with each of the .S functional units 16a, 16b in more detail. For a predicate register selected by creg field 506, if z-bit 508 is "1", then GO-1 signal 702 is asserted when the contents of the selected predicate register equals zero as indicated by signal 704 which is provided by a centralized comparison circuit (not shown in this Figure). Likewise, when the z-bit is "0", then signal GO-1 702 is asserted if the contents of the predicate register is not zero. When signal GO-1 is not asserted, the BDEC instruction is treated as a NOP and a branch is prohibited by inhibiting delivery of a branch address to program counter 750 in response to signal 708.

Test circuitry 720 tests the contents of the test register specified by destination field 502 of a BDEC instruction to determine if the contents of the test register meet a certain condition. Note that the selected test register is accessed from associated register file 20a, 20b via a source port. Test circuitry 720 asserts a signal GO-2 722 if the signed value in the selected register is not negative, which in this embodiment is determined by testing the most significant bit: if it is one, then the signed value is negative. Thus, test circuitry 720 is simply an inverter gate. Signal GO-2 is connected to write inhibit circuitry 706. If the contents of the selected test register is negative, then the branch is not taken and signal 708 is asserted to inhibit updating the program counter.

Program counter update enable signal 708 is essentially a logical AND of signal GO-1 and GO-2.

Decrement circuitry 730 decrements the contents of the selected test register. If signal GO-2 is asserted mux 732 provides the decremented value to the selected destination register, otherwise the selected destination register is rewritten with the same value by appropriate selection of mux 732.

Adder 740 adds a sign extended value of displacement field 504 provided via signals 742 to the contents of PCE1 register 744. The resulting address is written into program counter 750 only if both GO-1 and GO-2 are asserted, in accordance with signal 708.

Figure 8:
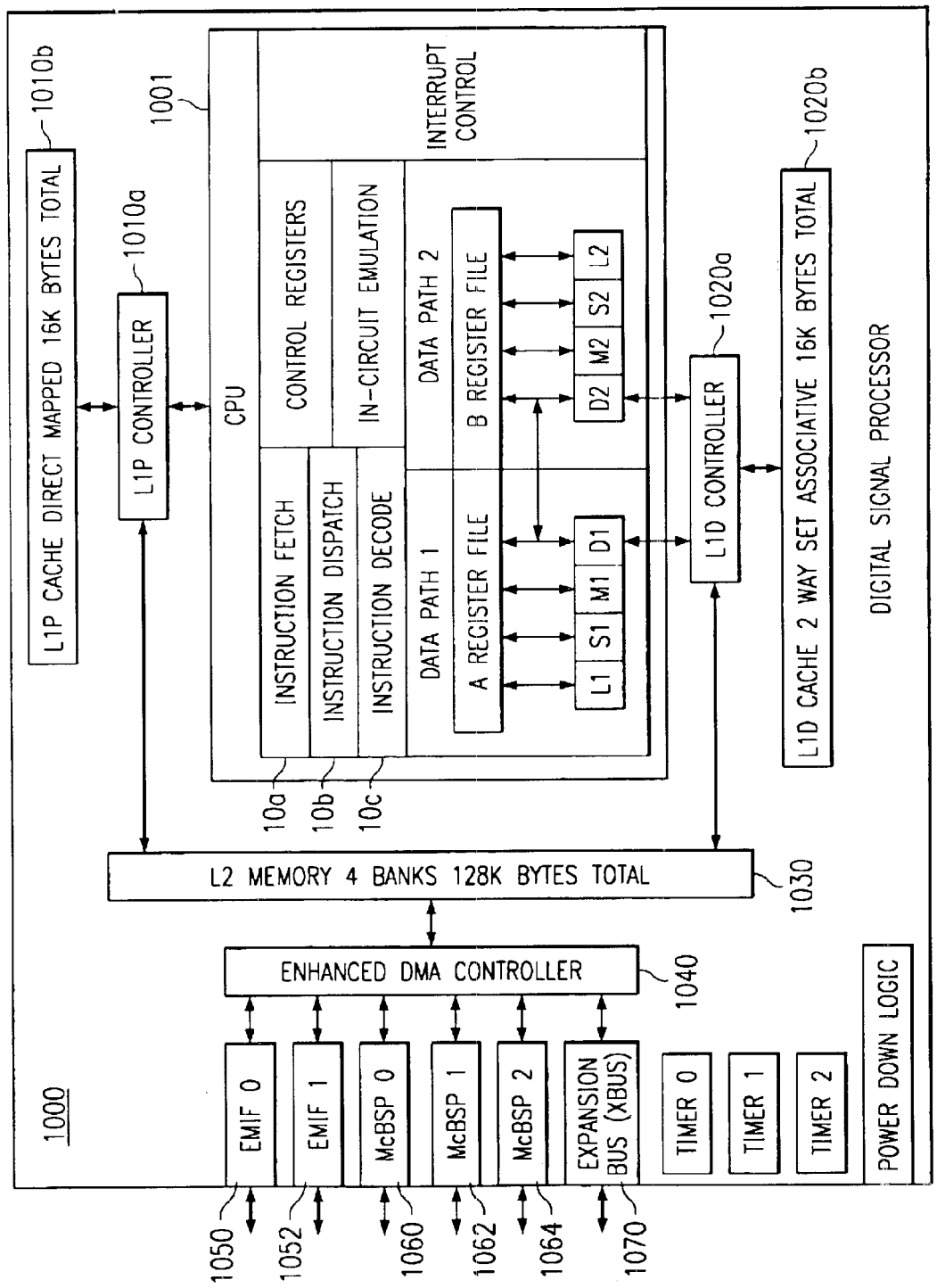
FIG. 8 is a block diagram of an alternative embodiment of the processor of FIG. 1.

FIG. 8 is a block diagram of an alternative embodiment of the present invention in a digital system 1000 with processor core 10 of FIG. 1. A direct mapped program cache 1010, having 16 kbytes capacity, is controlled by L1 Program (L1P) controller 1011 and connected thereby to the instruction fetch stage 10a. A 2-way set associative data cache, having a 16 Kbyte capacity, is controlled by L1 Data (L1D) controller 1721 and connected thereby to data units D1 and D2. An L2 memory 1030 having four banks of memory, 128 Kbytes total, is connected to L1P 1011 and to L1D 1021 to provide storage for data and programs. External memory interface (EMIF) 1050 provides a 64 bit data path to external memory, not shown, which provides memory data to L2 memory 1030 via extended direct memory access (DMA) controller 1040.

EMIF 1052 provides a 16-bit interface for access to external peripherals, not shown. Expansion bus 1070 provides host and I/O support similarly to host port 60/80 of FIG. 1.

Three multi-channel buffered serial ports (McBSP) 1060, 1062, 1064 are connected to DMA controller 1040. A detailed description of a McBSP is provided in U.S. Pat. No. 6,167,466 and is incorporated herein reference.

Figure 9:
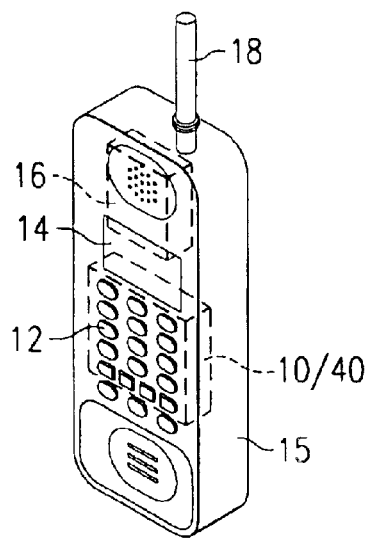
FIG. 9 illustrates an exemplary implementation of a digital system that includes an embodiment of the present invention in a mobile telecommunications device.

FIG. 9 illustrates an exemplary implementation of a digital system that includes DSP 10 packaged in and co-located with an integrated circuit 40 in a mobile telecommunications device, such as a wireless telephone 15. Wireless telephone 15 has integrated keyboard 12 and display 14. As shown in FIG. 9, DSP 10 is connected to the keyboard 12, where appropriate via a keyboard adapter (not shown), to the display 14, where appropriate via a display adapter (not shown) and to radio frequency (RF) circuitry 16. The RF circuitry 16 is connected to an aerial 18. Advantageously, by providing a conditional branch instruction with a decrement function, complex signal processing algorithms can be written in a more efficient manner to satisfy the demand for enhanced wireless telephony functionality.

Fabrication of digital system 10 involves multiple steps of implanting various amounts of impurities into a semiconductor substrate and diffusing the impurities to selected depths within the substrate to form transistor devices. Masks are formed to control the placement of the impurities. Multiple layers of conductive material and insulative material are deposited and etched to interconnect the various devices. These steps are performed in a clean room environment.

A significant portion of the cost of producing the data processing device involves testing. While in wafer form, individual devices are biased to an operational state and probe tested for basic operational functionality. The wafer is then separated into individual dice which may be sold as bare die or packaged. After packaging, finished parts are biased into an operational state and tested for operational functionality.

Thus, a digital system is provided with a processor having an improved instruction set architecture. The processor is code-compatible with C62xx DSP processors from Texas Instruments Incorporated. It provides a superset of the C62x architecture while providing complete code compatibility for existing C62x code. The processor provides extensions to the existing C62x architecture in several areas: register file enhancements, data path extensions, additional functional unit hardware, increased orthogonality of the instruction set, data flow enhancements, 8-bit and 16-bit extensions, and additional instructions that reduce code size and increase register flexibility.

Advantageously, a conditional branch with decrement instruction is provided to combine the function of testing and decrementing an index register within a conditional branch instruction. Code size is thereby reduced and performance improved.

As used herein, the terms "applied," "connected," and "connection" mean electrically connected, including where additional elements may be in the electrical connection path. "Associated" means a controlling relationship, such as a memory resource that is controlled by an associated port. The terms assert, assertion, de-assert, de-assertion, negate and negation are used to avoid confusion when dealing with a mixture of active high and active low signals. Assert and assertion are used to indicate that a signal is rendered active, or logically true. De-assert, de-assertion, negate, and negation are used to indicate that a signal is rendered inactive, or logically false.

While the invention has been described with reference to illustrative embodiments, this description is not intended to be construed in a limiting sense. Various other embodiments of the invention will be apparent to persons skilled in the art upon reference to this description. In another embodiment, the dst operand may be provided in response to a memory fetch instead of being read from the register file. A BDEC instruction may be executed in another functional unit instead of or in addition to the .S functional units. In another embodiment, a conditional branch instruction may be conditional on another condition instead of greater than or equal. A field may be provided to select from several different conditions for testing the test register. In another embodiment, the test register may be modified in a different manner than decrementing; for example, the test register may be incremented and the instruction could be referred to as a branch-increment instruction. In another embodiment, the test register may be decremented prior to testing.

It is therefore contemplated that the appended claims will cover any such modifications of the embodiments as fall within the true scope and spirit of the invention.

What is claimed is:

1. A digital system comprising a microprocessor having an instruction execution pipeline with a plurality of pipeline phases, wherein the microprocessor comprises:
    program fetch circuitry operable to perform a first portion of the plurality of pipeline phases;
    instruction decode circuitry connected to receive fetched instructions from the program fetch circuitry, the instruction decode circuitry operable to perform a second portion of the plurality of pipeline phases; and
    at least a first functional unit connected to receive a plurality of control signals from the instruction decode circuitry, the functional unit operable to perform a third portion of the plurality of pipeline phases, the third portion being execution phases, wherein the first functional unit comprises:
    first test circuitry connected to receive an operand from a selected test register, and having an output for indicating a condition of the operand;
    decrement circuitry connected to receive the operand from the selected test register, and having an output connected to conditionally provide a decremented value of the operand to the test register dependent upon said indicated condition of the operand;
    adder circuitry connected to receive a program counter value and a displacement value, and having an output connected to conditionally provide a branch address to a program counter register dependent upon said indicated condition of the operand; and
    wherein the first test circuitry, the decrement circuitry, and the adder circuitry are all operable to test the operand, conditionally decrement the operand, and conditionally provide a branch address to the program counter in response to a single conditional branch-decrement instruction.

2. The digital system of claim 1, wherein the first test circuitry, the decrement circuitry, and the adder circuitry are all operable to test the operand, conditionally decrement the operand, and conditionally provide a branch address to the program counter in response to a single conditional branch-decrement instruction during a single one of the third portion of pipeline phases.

3. The digital system of claim 1, further comprising second test circuitry connected to test a condition of a selected predicate register, and having an output for indicating a condition of the predicate register, wherein the second test circuitry is operable to inhibit the program counter from receiving the branch address if the contents of the predicate register do not correspond to a second condition.

4. The digital system of claim 1, further comprising:
    a register file including a plurality of general purpose registers, each general purpose register capable of supplying an operand to a functional unit and capable of receiving destination data generated by a functional unit; and
    wherein said conditional branch-decrement instruction designates one of said general purpose registers as said selected test register.

5. The digital system of claim 4, further comprising:
    second test circuitry connected to test a condition of a selected predicate register, and having an output for indicating a condition of the predicate register, wherein the second test circuitry is operable to inhibit the program counter from receiving the branch address and inhibit said step of modifying the contents of the test register if the contents of the predicate register do not correspond to a second condition; and
    wherein said conditional branch-decrement instruction designates one of said general purpose registers as said predicate register.

6. The digital system of claim 5, wherein:
    said conditional branch-decrement instruction designates one of said general purpose registers of a predetermined subset of said general purpose registers as said predicate register.

7. The digital system of claim 1, wherein:
    said program fetch circuitry operable to fetch a fetch packet of a predetermined plurality of instructions each first portion of the plurality of pipeline phases starting at predetermined address boundaries; and
    said adder circuitry adds said displacement value to a last predetermined address boundary.

8. The digital system of claim 7, wherein:
    said instruction decode circuitry reads a predetermined bit of each instruction to determine an execute packet of instructions capable of execution in parallel on a plurality of functional units, wherein an execute packet may include instructions in two sequential fetch packets; and said adder circuitry adds said displacement value to said last predetermined address boundary of said fetch packet of said conditional branch-decrement instruction.

9. A method of operating a digital system having a microprocessor with a conditional branch-decrement instruction, comprising the steps of:

fetching a conditional branch-decrement instruction for execution;

testing a test register selected by the conditional branch-decrement instruction from among a plurality of distinct data registers to determine if the contents of the test register meet a first condition;

providing a branch address to a program counter to cause a branch if the contents of the test register meet the first condition; and modifying the contents of the test register if the contents of the test register meet the first condition.

10. The method of claim 9, further comprising the steps of:

testing a predicate register selected by the conditional branch-decrement instruction to determine if the contents of the predicate register meet a second condition; and inhibiting the step of providing a branch address to the program counter and inhibiting said step of modifying the contents of the test register if the contents of the predicate register do not meet the second condition.

11. The method of claim 9, wherein the steps of testing, providing, and modifying are all performed during a same execution phase of the microprocessor.

12. The method of claim 9, further comprising the steps of:

storing data in a register file including a plurality of distinct general purpose registers;

recalling data from an instruction designated general purpose register for supplying an operand to a functional unit;

storing destination data generated by a functional unit in an instruction designated general purpose register; and designating via the conditional branch-decrement instruction one of said general purpose registers as said selected test register.

13. The method of claim 12, further comprising:

testing a predicate register selected by the conditional branch-decrement instruction to determine if the contents of the predicate register meet a second condition; and designating via the conditional branch-decrement instruction one of said general purpose registers as said predicate register.

14. The method of claim 13, wherein:

said step of designating said predicate register designates said predicate register from a predetermined subset of said general purpose registers as said predicate register.

15. The method of claim 9, wherein:

said step of fetching instructions fetches a fetch packet of a predetermined plurality of instructions; and said step of providing a branch address to the program counter adds a displacement value to a last predetermined address boundary.

16. The method of claim 15, wherein:

reading a predetermined bit of each instruction to determine an execute packet of instructions capable of execution in parallel on a plurality of functional units, wherein an execute packet may include instructions in two sequential fetch packets;

dispatching each instruction of each execute packet to a corresponding functional unit in parallel;

said step of providing a branch address to the program counter adds said displacement value to a last predetermined address boundary of a second sequential fetch packet if said second sequential fetch packet contains said conditional branch-decrement instruction.

17. A method of operating a digital system having a microprocessor with a conditional branch-decrement instruction, comprising the steps of:

fetching a conditional branch-decrement instruction for execution;

testing a test register selected by an operand field of the conditional branch-decrement instruction to determine if the contents of the test register meet a first condition;

providing a branch address to a program counter to cause a branch if the contents of the test register meet the first condition; and modifying the contents of the test register if the contents of the test register meet the first condition.

18. The method of claim 17, further comprising the steps of:

storing data in a register file including a plurality of distinct general purpose registers;

recalling data from an instruction designated general purpose register for supplying an operand to a functional unit;

storing destination data generated by a functional unit in an instruction designated general purpose register; and designating via the conditional branch-decrement instruction one of said general purpose registers as said selected test register.

19. The method of claim 17, wherein:

said step of providing a branch address to the program counter to cause a branch combines a displacement field of the conditional branch-decrement instruction with current contents of the program counter.

20. The method of claim 17, wherein:

said step of providing a branch address to the program counter adds a signed displacement designated by the displacement field of the conditional branch-decrement instruction to current contents of the program counter.

21. The method of claim 17, wherein:

said step of providing a branch address to the program counter left shifts a signed displacement designated by the displacement field of the conditional branch-decrement instruction by a predetermined amount and adds the left shifted signed displacement to current contents of the program counter.

22. A method of operating a digital system having a microprocessor with a conditional branch-decrement instruction, comprising the steps of:

fetching a conditional branch-decrement instruction for execution;

testing a test register selected by the conditional branch-decrement instruction to determine if the contents of the test register meet a first condition;

providing a branch address to a program counter to cause a branch by combining a displacement field of the conditional branch-decrement instruction with current contents of the program counter if the contents of the test register meet the first condition; and modifying the contents of the test register if the contents of the test register meet the first condition.

23. The method of claim 22, further comprising the steps of:

storing data in a register file including a plurality of distinct general purpose registers;

recalling data from an instruction designated general purpose register for supplying an operand to a functional unit;

storing destination data generated by a functional unit in an instruction designated general purpose register; and designating via the conditional branch-decrement instruction one of said general purpose registers as said selected test register.

24. The method of claim 22, wherein:

said step of providing a branch address to the program counter adds a signed displacement designated by the displacement field of the conditional branch-decrement instruction to current contents of the program counter.

25. The method of claim 22, wherein:

said step of providing a branch address to the program counter left shifts a signed displacement designated by the displacement field of the conditional branch-decrement instruction by a predetermined amount and adds the left shifted signed displacement to current contents of the program counter.

* * * * *